United States Patent
Lee et al.

(10) Patent No.: US 10,378,595 B2
(45) Date of Patent: Aug. 13, 2019

(54) SEGMENTED WEDGE CLUTCH WITH SPRING CLIPS

(71) Applicant: SCHAEFFLER TECHNOLOGIES AG & CO. KG, Herzogenaurach (DE)

(72) Inventors: Brian Lee, York, SC (US); Carsten Ohr, Charlotte, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 221 days.

(21) Appl. No.: 15/388,297

(22) Filed: Dec. 22, 2016

(65) Prior Publication Data

US 2018/0180110 A1 Jun. 28, 2018

(51) Int. Cl.
*F16D 13/16* (2006.01)
*F16D 13/66* (2006.01)

(52) U.S. Cl.
CPC .............. *F16D 13/16* (2013.01); *F16D 13/66* (2013.01)

(58) Field of Classification Search
CPC ........ F16H 13/16; F16H 13/66; F16H 13/646; F16H 13/68
See application file for complete search history.

(56) References Cited

U.S. PATENT DOCUMENTS

| | | |
|---|---|---|
| 2015/0014113 A1 | 1/2015 | Ohr et al. |
| 2015/0083539 A1 | 3/2015 | Lee et al. |
| 2015/0152921 A1 | 6/2015 | Lee |
| 2016/0084326 A1 | 3/2016 | Ramsey |
| 2018/0180111 A1* | 6/2018 | Ince .......... F16D 13/24 |
| 2018/0238396 A1* | 8/2018 | Lee .......... F16D 13/16 |

OTHER PUBLICATIONS

Lee, Brian, "AWD Disconnect, Escaping the clutches of the dog", Schaeffler Symposium 2014, 26 pages.

\* cited by examiner

*Primary Examiner* — Huan Le
(74) *Attorney, Agent, or Firm* — Brooks Kushman P.C.

(57) ABSTRACT

A clutch for selectively coupling first and second rotational members includes a hub rotatable about an axis and connectable to the first rotational member, and a carrier rotatable about the axis and connectable to the second rotational member. One of the hub and the carrier defines an annular groove and the other of the hub and the carrier defines a ramped surface. A wedge plate of the clutch has a first edge disposed on the ramped surface, a second edge disposed in the annular groove, and a face extending between the edges and defining an annular shoulder. An annular resilient member is seated against the shoulder.

20 Claims, 3 Drawing Sheets

US 10,378,595 B2

SEGMENTED WEDGE CLUTCH WITH SPRING CLIPS

TECHNICAL FIELD

The present disclosure relates to wedge clutches for coupling two or more rotatable elements.

BACKGROUND

A vehicle powertrain may include a wedge clutch for coupling an input shaft to an output shaft. The wedge clutch includes an inner race connected to one of the shafts and an outer race connected to the other of the shafts. A wedge plate is radially disposed between the inner and outer races and is configured to engage the inner and outer races when the clutch is locked to transmit power from the input shaft to the output shaft.

SUMMARY

According to one embodiment, a clutch for selectively coupling first and second rotational members includes a hub rotatable about an axis and connectable to the first rotational member, and a carrier rotatable about the axis and connectable to the second rotational member. One of the hub and the carrier defines an annular groove and the other of the hub and the carrier defines a ramped surface. A wedge plate of the clutch has a first edge disposed on the ramped surface, a second edge disposed in the annular groove, and a face extending between the edges and defining an annular shoulder. An annular resilient member is seated against the shoulder.

According to another embodiment, a wedge clutch has first and second concentric races supported for rotation about a common axis. A wedge plate for the wedge clutch includes a plurality of arcuate segments arranged to form a disk. Each of the segments has an inner edge engageable with the first race, an outer edge engageable with the second race, and first and second opposing faces extending between the inner and outer edges. A retaining ring is adjacent to the first face on each of the arcuate segments to secure the segments as the disk. At least one clip is provided to secure the retaining ring to the disk. The clip includes a retaining portion disposed against the retaining ring and a clip portion connected to the disk.

According to yet another embodiment, a clutch includes a hub supported for rotation about an axis and a carrier supported for rotation about the axis. A wedge plate frictionally engages between the hub and the carrier when the clutch is locked to couple the hub and the carrier. The wedge plate includes a plurality of wedge segments arranged for rotation about the axis. A retaining ring interconnects the wedge segments to form a disk. A clip secures the retaining ring to the disk.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
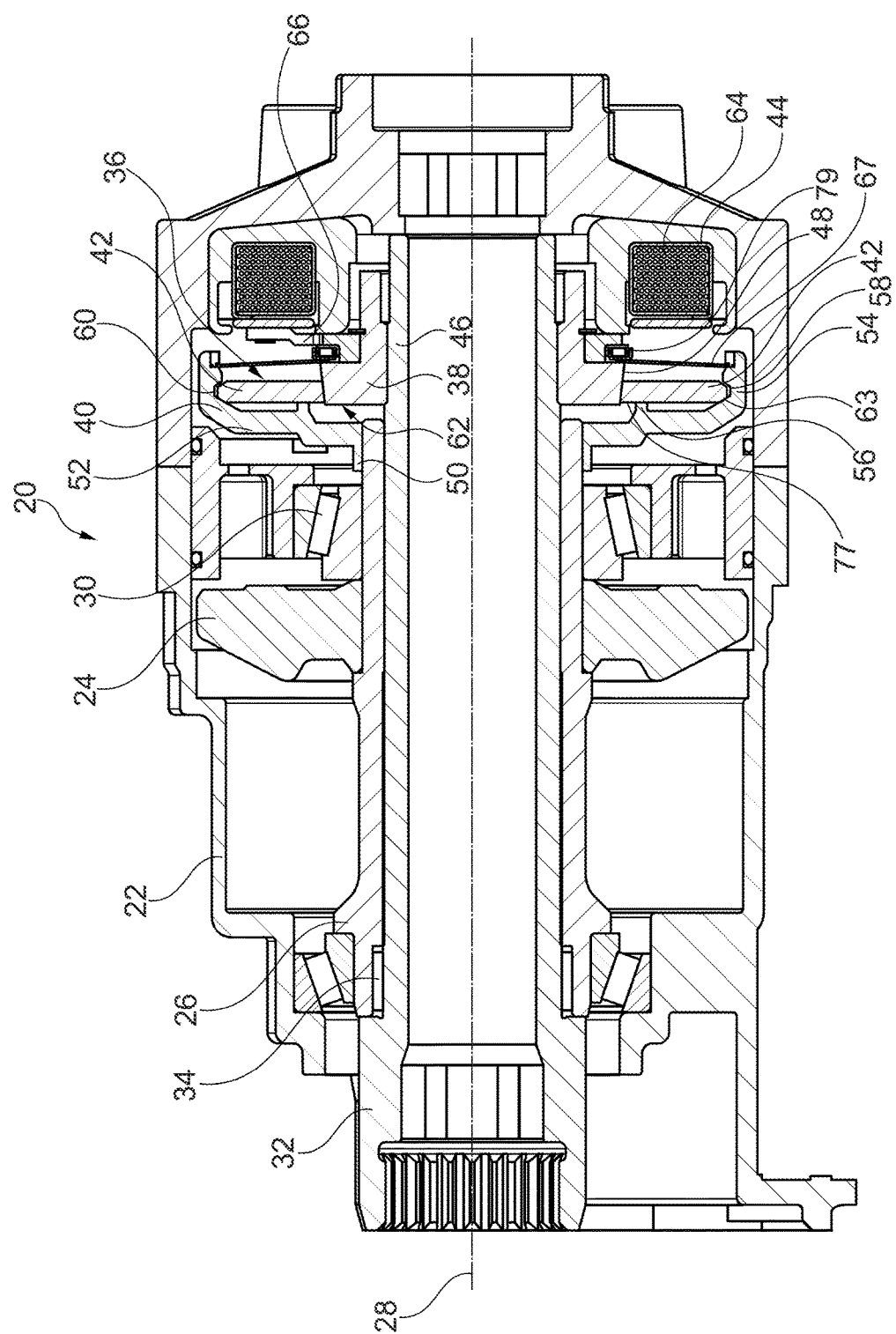
FIG. 1 is a side cross-sectional view of a power transfer unit having a wedge clutch according to one embodiment.
Figure 2:
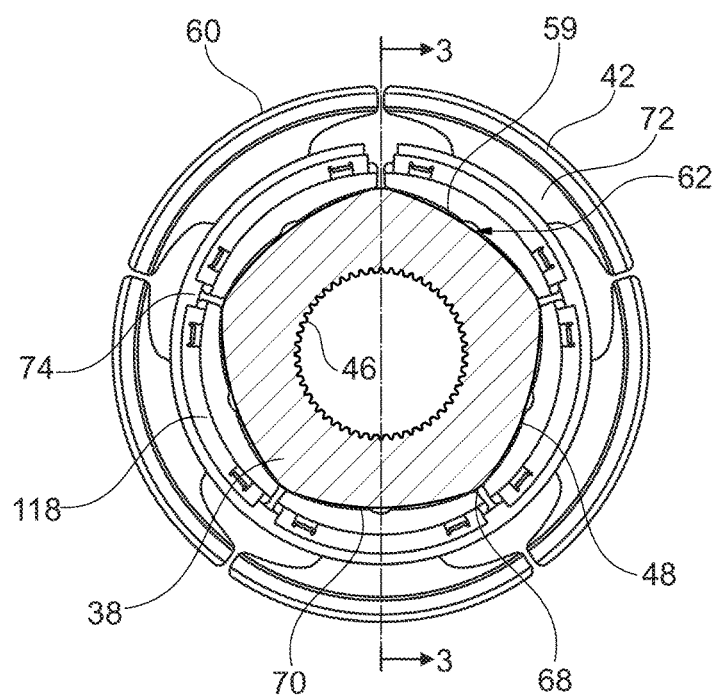
FIG. 2 is a partial cross-sectional view of the disk and the hub of the wedge clutch of FIG. 1.

Referring to FIGS. 1 and 2, a power-transfer unit 20 (PTU) for a powertrain is shown. The PTU 20 may be for an all-wheel-drive motor vehicle such as a passenger car or truck. The PTU 20 includes a housing 22 that supports an input shaft 26 for rotation about an axis 28 via bearings 30. A gear 24 may be fixed to the input shaft 26 by a spline connection. The gear 24 may be driveably connected to a transmission output shaft. Two components are driveably connected if they are connected by a power flow path that constrains their rotational speeds to be directly proportional. An output shaft 32 is disposed in the housing 22 and is supported for rotation about the axis 28 via bearings 34.

A wedge clutch 36 is disposed in the housing 22 and selectively couples the input shaft 26 to the output shaft 32 to transfer torque from the input shaft 26 to the output shaft 32. The clutch 36 has a closed state (also referred to as a locked state) in which the input and output shafts are coupled to each other and an open state (also referred to as an unlocked state) in which the input and output shafts are independently rotatable relative to each other. The wedge clutch 36 may include a hub 38 (which may be referred to as an inner race), a carrier 40, and a disk 42 (which may be referred to as a wedge plate) that are all supported for rotation about the axis 28.

The hub 38 includes an inner surface 46 connected to the output shaft 32 and an outer ramped surface 48. The ramped surface is inclined in the axial direction. The carrier 40 includes a base 50 connected to the input shaft 26, a radially extending portion 52, and an axially extending portion 54 (which may be referred to as an outer race). A projection 56 extends axially from the radially extending portion 52 and engages with the disk 42.

The disk 42 is radially disposed between the hub 38 and the axially extending portion 54. An inner edge 59 of the disk 42 defines a generally circular opening 62 that receives the hub 38 and is seated on the ramped surface 48. An outer edge 60 of the disk 42 is disposed in a groove 58 of the carrier 40. The groove may include opposing ramped surfaces 63. When the clutch 36 is locked, the outer edge 60 frictionally engages with the groove 58 and the inner edge 59 engages with the ramped surface 48 to couple the carrier 40 to the hub 38 creating a power flow path between the input shaft 26 and the output shaft 32.

An actuator 44 moves the clutch 36 between the open and closed states. The actuator 44 may be an electric actuator, as shown, or may be a hydraulic or mechanical actuator. In one embodiment, the electric actuator 44 includes electric coils 64 and an armature 66. The armature 66 is connected to the hub 38 and slides the hub towards the carrier 40 when energized to lock the clutch. A spring 67 may bias the hub 38 away from the carrier 40 to unlock the clutch when the armature 44 is de-energized. In some embodiments, the spring 67 is eliminated in lieu of a bidirectional actuator that also slides the hub 38 away from the carrier 40 to unlock the clutch.

The disk 42 may include multiple segments 72 (also known as wedge segments) retained together by an annular resilient member such as a retaining ring 74. The retaining ring 74 is formed of spring steel or other resilient material. Each of the segments 72 are annular and collectively form the disk 42 when assembled together. The retaining ring 74 may be secured to the disk 42 by clips 118.

The ramped surface 48 of the hub is not a perfect circle and includes cams 68 that ramp radially outward from the center of the hub. The cams 68 cooperate with the cams 70 on the inner edge 59 of the disk 42 to force the disk 42 radially outward to engage with the axially extending portion 54 when the clutch is locked. The segments 72 are moveable relative to each other allowing the disk to expand. Having multiple segments aids in the radial expansion of the disk. Multi-segment disks radially expand more uniformly than single-piece disks providing better engagement between the disk 42 and the carrier 40.

The clutch 36 is illustrated in the open state in FIGS. 1 and 2 with the disk 42 being axially located near a first end 77 of the hub, and the disk 42 being loosely disposed in the groove 58 and on the hub 38. Locking of the clutch 36 is initiated by sliding the hub 38 towards the carrier 40 causing the disk 42 to slide on the ramped surface 48. The increasing diameter of the ramped surface 48 expands the disk 42 as it moves towards the second end 79 of the hub 38 increasing friction between the disk 42 and the carrier 40. The friction force between the carrier 40 and the disk 42 decelerates the disk 42 causing relative rotation between the disk 42 and the hub 38. When the disk 42 and the hub 38 rotate relative to each other, the cams 68 and 70 cooperate to further radially expand the disk 42 increasing the frictional engagement with the groove 58 causing the clutch 36 to lock.

Figure 3:
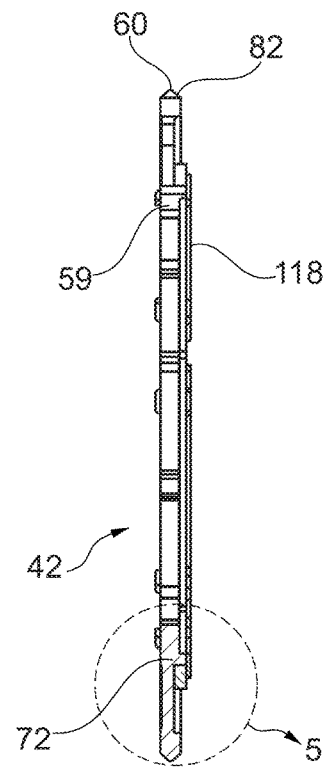
FIG. 3 is cross-sectional view of the disk taken along cut line 3-3.
Figure 4:
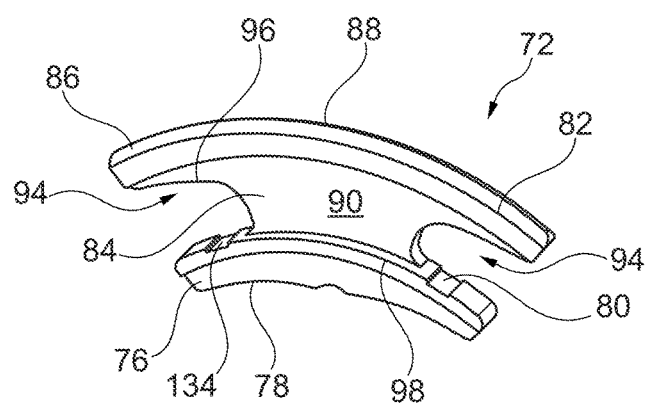
FIG. 4 is a perspective view of a wedge segment of the disk.
Figure 5:
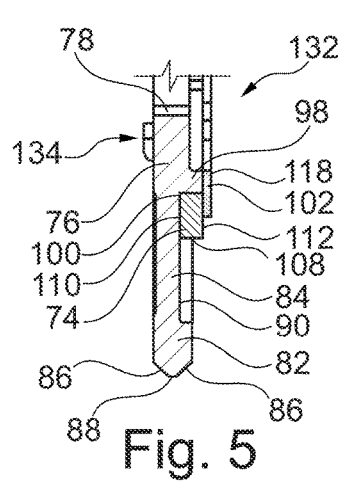
FIG. 5 is a magnified cross-sectional view of the disk.

Referring to FIGS. 3, 4 and 5, each of the arcuate segments 72 includes a base portion 76 having an inboard surface 78 disposed on the hub 38. The inboard surfaces 78 of the base portions 76 collectively define the inner edge 59 of the disk 42. Each of the arcuate segments 72 also includes an outer portion 82 connected to the base portion 76 by a web 84. The web 84 extends between an outboard surface 80 of the base portion 76 to the outer portion 82. The outer portion 82 may define a flat tip 88 and a pair of opposing slanted surfaces 86 as illustrated or may be a cylindrical surface The slanted surfaces 86 frictionally engage with slanted surfaces 63 of the groove 58 when the clutch is locked. The slanted surfaces provide increased friction force between the disk 42 and the carrier 40. The outer portions 82 collectively define the outer edge 60 of the disk 42. A pair of openings 94 is defined in each of the arcuate segment 72. The openings 94 extend completely through a thickness of the segment 72. Each of the openings 94 may include a U-shaped periphery 96 that is defined by the outboard surface 80 and the web 84. The base portion 76 is thicker than the web 84 creating an annular shoulder 98 extending axially from the first face 90 of the web 84. The shoulder 98 includes a step 100 extending axially from the first face 90 and a protruding face 102 that is actually offset from the first face 90. The shoulder 98 forms an annular seat for the retaining ring 74.

Figure 6:
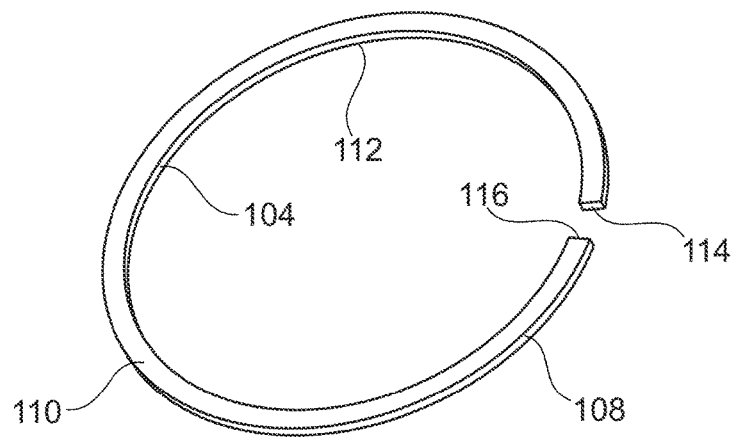
FIG. 6 is a perspective view of a retaining ring of the disk.
Figure 7:
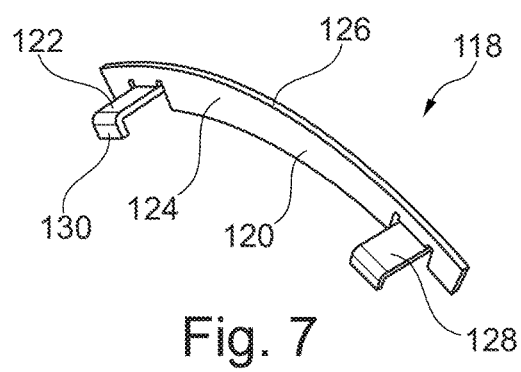
FIG. 7 is a perspective view of a clip that retains the retaining ring to the wedge segments.

Referring to FIGS. 5 and 6, the arcuate segments 72 are secured as a disk by the retaining ring 74. The retaining ring 74 includes an inner surface 104 seated against the shoulders 98 and an outer surface 108. The retaining ring 74 may have a rectangular cross section and have a first face 110 disposed against face 90 of the web 84 and a second face 112 the faces away from the web 84. In other embodiments, the ring 74 may have a circular cross section. The retaining ring 74 may be formed of a single piece of spring steel, or similar material, that has been formed into a generally circular shape with the first end 114 and the second end 116 adjacent to each other. The first and second ends are not connected to each other allowing the ring 74 to be easily installed onto each of the segments 72. The retaining ring 74 biases the disk 42 into the contracted position when the clutch is open to disengage the disk 42 from the carrier 40. The spring force of the retaining ring 74 is selected such that the disk 42 can expand on the ramped surface 48 when the hub 38 axially slides toward the second end 79.

One or more clips 118 retain the retaining ring 74 to the disk 42. In the illustrated embodiment, the number of clips equals the number of arcuate segments 72 with one clip being attached to each of the segments 72. Each of the clips 118 includes an arcuate body 120 having an engaging side 124 disposed against the second face 112 of the retaining ring 74 and an exposed side 126. A pair of prongs 122 secures the body 120 to the arcuate segment 72. Each of the prongs 122 includes an elongated member 128 extending from the engaging side 124. A hooked end 130 is connected to a distal end of the elongate member 128. Each of the prongs 122 extends through one of the openings 94 allowing the body 120 to be disposed against a front side 132 of the segment 72 and the hooked end 130 to engage with the back side 134 of the segment. The outboard surface 80 may define one or more clips slots 136 that each receive one of the elongate members 128. The clip slots 136 are recessed into the base portion 76. The base portions 76 may include features on the back side 134 that the hooked end 130 snaps on to.

Figure 8:
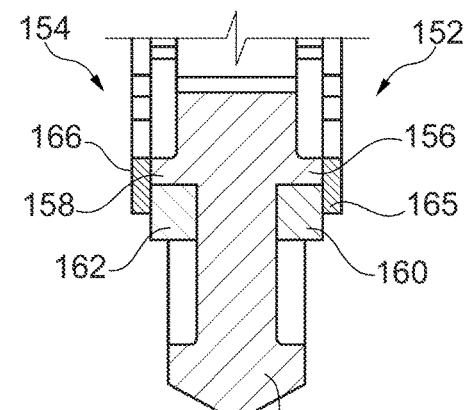
FIG. 8 is a side cross-sectional view of a disk having two retaining rings.

Referring to FIG. 8, the disk of the wedge clutch may include a pair of retaining with each ring on a side of the disk. In one embodiment, a dual-ring disk 150 includes a first side 152 and a second side 154. The first side 154 includes an annular shoulder 156, and the second side 154 includes an annular shoulder 158. A first retaining ring 160 is disposed on the first shoulder 156, and a second retaining ring 162 is disposed on the second shoulder 158. A first set of clips 164 retains the first ring 156 to the first side 152, and a second set of clips 166 retains the second ring 158 to the second side 154.

Wedge clutches may be used in many different applications other than in a PTU. Wedge clutches may be used in any application that requires two or more rotating components to be selectively coupled together. Other possible uses include between a gear and a shaft and any other application in which two or more rotatable member are required to be selectively coupled.

This disclosure is not limited to the illustrated embodiments that show the outer race defining the groove and the inner race defining the ramped surface. In other embodiments, the placement of the hub and carrier are switched with the carrier being the inner race and the hub being the outer race. Here, the inner edge of the disk engages with a groove defined in the inner race, and the outer edge of the disk is disposed on the ramped surface of the outer race. Additional structure and operation of the wedge clutch is provided in the following documents, which are incorporated in their entirety by reference herein: U.S. patent application Ser. No. 15/388,270, filed on the same day as this disclosure; U.S. patent application Ser. No. 15/388,239, filed on the same day as this disclosure; U.S. patent application Ser. No. 15/388,213, filed on the same day as this disclosure; U.S. patent application Ser. No. 15/388,292, filed on the same day as this disclosure; and U.S. patent application Ser. No. 15/388,395, filed on the same day as this disclosure.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A clutch for selectively coupling first and second rotational members, the clutch comprising:
    a hub rotatable about an axis and connectable to the first rotational member;
    a carrier rotatable about the axis and connectable to the second rotational member, wherein a one of the hub or the carrier defines an annular groove and the other one of the hub or the carrier defines a ramped surface;
    a wedge plate including a first edge disposed on the ramped surface, a second edge disposed in the annular groove, and a face extending between the edges and defining an annular shoulder; and
    an annular resilient member seated against the shoulder.

2. The clutch of claim 1 further comprising a retainer that secures the resilient member to the wedge plate.

3. The clutch of claim 2, wherein the retainer includes a body that engages with the resilient member and at least one prong that clips onto the wedge plate.

4. The clutch of claim 3, wherein the prong extends through an opening defined in the wedge plate.

5. The clutch of claim 1, wherein the shoulder defines a step, and the annular resilient member is seated against the step.

6. The clutch of claim 1, wherein the wedge plate further includes a plurality of annular segments arranged in a disk and secured together by the annular resilient member.

7. The clutch of claim 1, wherein the groove is defined by a first pair of angled surfaces, and the second edge defines a second pair of angled surfaces that engage with the first pair of angled surfaces when the clutch is closed.

8. A wedge plate for a wedge clutch having first and second concentric races supported for rotation about a common axis, the wedge plate comprising:
    a plurality of arcuate segments arranged to form a disk, each of the segments including an inner edge engageable with the first race, an outer edge engageable with the second race, and first and second opposing faces extending between the inner and outer edges;
    a retaining ring adjacent the first face on each of the arcuate segments to secure the segments as the disk; and
    at least one clip including a retaining portion disposed against the retaining ring and a clip portion connected to the disk.

9. The wedge plate of claim 8, wherein each of the segments defines a shoulder extending axially from one of the faces, and the retaining ring is seated on the shoulder.

10. The wedge plate of claim 8, wherein the retaining portion engages with the first face on a corresponding one of the arcuate segments and the clip portion engages with the second face of the corresponding arcuate segment.

11. The wedge plate of claim 10, wherein the corresponding arcuate segment defines an opening and the clip portion extends through the opening.

12. The wedge plate of claim 11, wherein a perimeter surface of the opening defines a recessed slot, and the clip portion is disposed in the slot.

13. The wedge plate of claim 8, wherein the retaining portion is arcuate.

14. The wedge plate of claim 8, wherein the clip portion further includes an elongate member extending through the disk and a hook member engaging with the second face of one of the arcuate segments.

15. The wedge plate of claim 8, wherein the wedge plate includes an equal amount of arcuate segments and clips, and wherein each of the arcuate segments is connected to a corresponding one of the clips.

16. A clutch comprising:
    a hub supported for rotation about an axis;
    a carrier supported for rotation about the axis; and
    a wedge plate that frictionally engages between the hub and the carrier when the clutch is locked to couple the hub and the carrier, the wedge plate including:
        a plurality of wedge segments arranged for rotation about the axis,
        a retaining ring interconnecting the wedge segments to form a disk, and
        a clip that secures the retaining ring to the disk.

17. The clutch of claim 16, wherein the disk defines an opening and a portion of the clip extends through the opening.

18. The clutch of claim 16, wherein the clip includes an annular body disposed against the retaining ring and a prong extending from the annular body and including a hooked end clipped to one of the wedge segments.

19. The clutch of claim 16, wherein the clip is a plurality of clips that are each attached to one of the wedge segments.

20. The clutch of claim 16 further comprising a second retaining ring disposed on a side of the disk opposite the retaining ring and engaging with each of the wedge segments.

* * * * *